United States Patent [19]

Johnson et al.

[11] Patent Number: 5,056,057
[45] Date of Patent: Oct. 8, 1991

[54] KEYBOARD INTERFACE FOR USE IN COMPUTERS INCORPORATING TERMINATE-AND-STAY-RESIDENT PROGRAMS

[75] Inventors: Jack D. Johnson; Roger A. Kaiser, Jr., both of Houston, Tex.

[73] Assignee: Compaq Computer Corporation, Houston, Tex.

[21] Appl. No.: 346,902

[22] Filed: May 3, 1989

[51] Int. Cl.[5] .................. G06F 3/023; G06F 13/24
[52] U.S. Cl. .................................... 364/900; 364/928; 364/941; 364/941.1; 364/950; 364/950.4; 364/975.4; 364/976; 341/22
[58] Field of Search ............... 341/26, 22; 340/711; 364/200, 900

[56] References Cited

U.S. PATENT DOCUMENTS

| 3,740,725 | 6/1973 | Fletcher et al. | 364/200 |
| 4,375,036 | 2/1983 | Miller et al. | 341/26 |
| 4,408,191 | 10/1983 | Fowler | 364/900 |
| 4,410,957 | 10/1983 | Cason et al. | 364/900 |
| 4,460,957 | 7/1984 | Eggebrecht et al. | 364/900 |
| 4,482,955 | 11/1984 | Amano et al. | 364/200 |
| 4,502,038 | 2/1985 | Lowenthal et al. | 341/26 |
| 4,644,497 | 2/1987 | Tajima et al. | 364/900 |
| 4,691,295 | 9/1987 | Erwine et al. | 364/900 |
| 4,710,869 | 12/1987 | Enokizono | 364/200 |

FOREIGN PATENT DOCUMENTS 56-24628  9/1981  Japan .................................. 341/26

OTHER PUBLICATIONS

Dahl et al., "Byte-Wide Processing For Keyboard Scanning," IBM Technical Disclosure Bulletin, vol. 23, No. 8 (Jan. 1981).
"8279/8279-5 Programmable Keyboard/Display Interface," *Microprocessor and Peripheral Handbook*, vol. II, Intel Corp., pp. 2-134 to 2-149 (1988).

*Primary Examiner*—Gareth D. Shaw
*Assistant Examiner*—Matthew C. Fagan
*Attorney, Agent, or Firm*—Brumbaugh, Graves, Donohue & Raymond

[57] ABSTRACT

An improved keyboard interface is provided for use with personal computers. A received scancode from the keyboard is made available at a port which may be repeatedly inspected by the CPU. The scancode data remains available until explicitly cleared by the CPU, or until a preestablished time-out interval has expired.

9 Claims, 4 Drawing Sheets

KEYBOARD INTERFACE FOR USE IN COMPUTERS INCORPORATING TERMINATE-AND-STAY-RESIDENT PROGRAMS

BACKGROUND OF THE INVENTION

The invention relates to a keyboard interface for a computer and, more particularly, to a keyboard interface for use in computers incorporating terminate-and-stay-resident (TSR) programs which intercept operator keyboard inputs.

Many computers, such as personal computers, are used with keyboards as the primary operator input devices. In such a computer the keyboard is coupled to the processor of the computer through a keyboard interface, which receives signals corresponding to pressing or releasing of keys on the keyboard and makes such signals available to the processor and the user program being executed therein. In many personal computers, the signals from the keyboard are in serial digital format and are converted to parallel digital format by the keyboard interface before being made available to the parallel data bus of the processor. An example of such a serial-to-parallel keyboard interface is described and claimed in U.S. Pat. No. 4,460,957 to Eggebrecht et al.

Personal computers commonly use a Basic Input-Output System (BIOS) comprising routines executed by the processor to provide a standardized interface between an application's program and the personal computer. The use of a BIOS results in a measure of hardware independence across different personal computer makes and models. In particular, keyboard routines are included in the BIOS to permit the applications program to obtain keyboard input. The BIOS routines are stored in ROM in most personal computers, although in some personal computers some or all of the routines are stored in RAM.

The BIOS routines include a so-called INT 9 routine and a so-called INT 16 routine, both of which have to do with keyboard function. When information about a keystroke is sent from the keyboard to the personal computer, the keyboard interface receives the information, which is called a scancode, and generates a hardware interrupt which is called the scancode interrupt. This interrupt, which is hardware interrupt 9, prompts the CPU to execute the INT 9 routine of the BIOS, which services that interrupt. The INT 9 routine processes the scancode, and if the scancode is indicative of a key value, places that key value in a keyboard buffer in RAM. When an applications program is ready to receive a key value, it calls the INT 16 routine, which obtains a key value from the RAM keyboard buffer and provides it to the applications program.

Not every scancode corresponds to a key value. For example, by convention both the pressing and the releasing of a key cause the keyboard to send a respective scancode to the computer. While the pressing of a key may give rise to a respective key value, the releasing of a key does not. Furthermore, the pressing or releasing of a SHIFT, CTRL, or ALT key does not give rise to a key value, although corresponding scancodes are generated and communicated to the personal computer. The INT 9 routine of the BIOS monitors the status of the SHIFT, CTRL and ALT keys and uses such status in deriving a key value corresponding to a received scancode.

The design of a typical personal computer is such that an applications program may be designed to intercept the scancode interrupt after it has been generated by the keyboard interface circuitry but prior to (or in place of) the execution of the INT 9 routine of the BIOS. An example of such a program is "Sidekick", a commercially available program published by Borland International, which is loaded into the personal computer but not immediately executed. Only when the user types a particular key or key combination, called a "hot key", does execution of that program commence. Such a program usually takes advantage of a feature of DOS which permits a program to become a TSR (terminate-and-stay-resident) program. A TSR program is loaded by DOS into a portion of RAM, which is then protected by DOS during loading of other applications programs in RAM. A TSR that commences its own execution upon user entry of a "hot key" sequence will be referred to as a "hot key TSR".

A hot key TSR, then, typically intercepts each scancode interrupt, inspects the scancode in the scancode port of the keyboard interface and, except where the scancode is that of the predefined "hot key", passes control on to the INT 9 routine of the BIOS. Where the scancode in the scancode port is that of the predefined "hot key", then the TSR commences execution of its own code.

The design of the typical BIOS is such that a user may choose to load a plurality of TSRs into the personal computer, each with its own associated hot key. Each time a scancode interrupt is generated by the keyboard interface, a chain of tests occurs. Each TSR in turn causes the inspection of the scancode port to determine if the scancode present at the scancode port represents its hot key. This may continue until the last TSR to inspect the contents of the scancode port without finding its hot key passes control to the INT 9 routine of the BIOS. The INT 9 routine derives a key value from the scancode and places the key value in the RAM keyboard buffer.

In some personal computers, particularly old models including the original IBM PC, the scancode present in the scancode port of the keyboard interface remains "valid", i.e. does not change, until such time as the scancode port is cleared by the CPU by means of a clear signal provided by the CPU to a port established for such control of the keyboard interface. In such computers, the BIOS INT 9 routine would send such a clear signal after receiving and processing each scancode.

In personal computers of more recent manufacture, including many personal computers designed to be compatible with the IBM PC AT, the scancode present in the scancode port of the keyboard interface remains valid for only a limited period of time (typically 1 millisecond) after first being read by the CPU.

The use of hot key TSRs in personal computers of the latter type has the problem in that if multiple hot key TSRs are used, by the time the last of the TSRs in its turn inspects the contents of the scancode port, such contents may have been replaced by a subsequent scancode received from the keyboard. Because the last of the TSRs may be unable to determine if the contents represent its hot key and BIOS itself may not be able to obtain key value information from the scancode port, keystrokes may be lost.

This problem with the use of hot key TSRs in personal computers of the latter type is exacerbated if there are numerous interrupt-driven background tasks using up some of the data bus's time during the limited interval during which all the TSRs must inspect the contents of the scancode port. Typical examples of such tasks are print spoolers and network handlers.

One feature provided by some personal computer makers is intended, among other things, to provide a way to avoid the above described problems. A so-called subservice 4F of interrupt 15 permits an applications program or TSR to be notified whenever new information has arrived at the scancode port. The intercepting applications program or TSR stores its own address in the INT 15 interrupt vector location, saving the previous contents of that location. The BIOS of such personal computers is designed so that when the INT 9 routine is executed in response to receipt of a scancode interrupt from the keyboard interface, the scancode from the scancode port is obtained, and before a key value is derived from that scancode, the routine calls interrupt 15H after having placed the value 4FH in a particular CPU register and the scancode in another particular CPU register. Because the intercepting TSR has stored its own address in the INT 15 location, control passes to the intercepting TSR. The intercepting TSR then tests for the 4FH value, and if the value is not 4FH, jumps to the address pointed to by the saved previous contents of that location. The result is that control passes to the address to which it would have passed if the TSR had not been installed. If the value is 4FH, the TSR retrieves the scancode and determines whether the scancode is indicative of the hot key of the TSR. If not, then the TSR jumps to the saved address just as it does when, as previously mentioned, the 4FH value is not found. If the scancode is indicative of the hot key, then the TSR retains control.

Such a TSR need not obtain the scancode from the scancode port, but instead gets it from the CPU register. Thus the above-mentioned problem that the scancode at the scancode port may no longer be valid when inspected by the TSR is avoided. Furthermore, assuming that the INT 9 routine managed to obtain the scancode from the scancode port within the one-millisecond interval, then the TSR can be assured of not having missed a scancode, even if the provision of the scancode to the TSR by way of CPU register occurs subsequent to the end of the one-millisecond interval during which the scancode at the port remained valid.

The availability of the subservice 4F in some personal computers does not, however, provide a satisfactory solution to the problem of multiple hot key TSRs. This is because most designers of hot key TSRs do not use the subservice 4F, as it is not available on all personal computers. Instead, most designers of hot key TSRs use the INT 9 interception technique described above.

In some personal computers, the keyboard interface is made so that it may be disabled from receiving additional scancodes by means of a command from the CPU, and reenabled by means of another command. It would thus be possible, in such personal computers, for the TSR to be designed so that whenever it intercepts a scancode interrupt, it immediately disables the keyboard interface. The keyboard interface would be reenabled only after the scancode has been processed.

Just as with the subservice 4F, however, the ability to disable the keyboard interface in some personal computers likewise does not provide a satisfactory solution to the problem of multiple hot key TSRs. The design of existing hot key TSRs would have to be changed to bring about the disabling. Further, the disabling and enabling commands issued for each scancode received from the keyboard would use up bus bandwidth.

Thus a need clearly exists for an object of the present invention to a computer keyboard interface which uses TSR programs for intercepting operator keyboard inputs but which avoids the problem of lost keystrokes without requiring special subservices or significant use of bus bandwidth and without requiring redesign of existing TSR programs.

SUMMARY OF THE INVENTION

The above-described problems of the prior art are substantially removed by the present invention which in one aspect is a computer having an improved keyboard interface configured so that a received scancode is maintained in the scancode port until the first of two conditions is satisfied: either a clear signal is received from the CPU (e.g. is provided by the INT 9 routine) or a predetermined interval (e.g. a few tens of milliseconds) has passed. Advantageously, the predetermined interval is changeable under program control by means of commands sent from the CPU to the keyboard interface, so that it can be shortened or extended to accommodate the mix of hot key TSRs used in a particular computer.

Another aspect of the present invention is a method for interfacing a keyboard to a central processor of a computer as carried out by the keyboard interface of the foregoing computer.

BRIEF DESCRIPTION OF THE DRAWINGS

The present invention will be better understood by reference to a detailed description of an exemplary embodiment, when read in conjunction with the accompanying drawings, in which.

Throughout the figures of the drawings, the same reference numerals and characters are used to denote like features, elements and regions of the illustrated apparatus.

DETAILED DESCRIPTION OF AN EXEMPLARY EMBODIMENT

Figure 1:
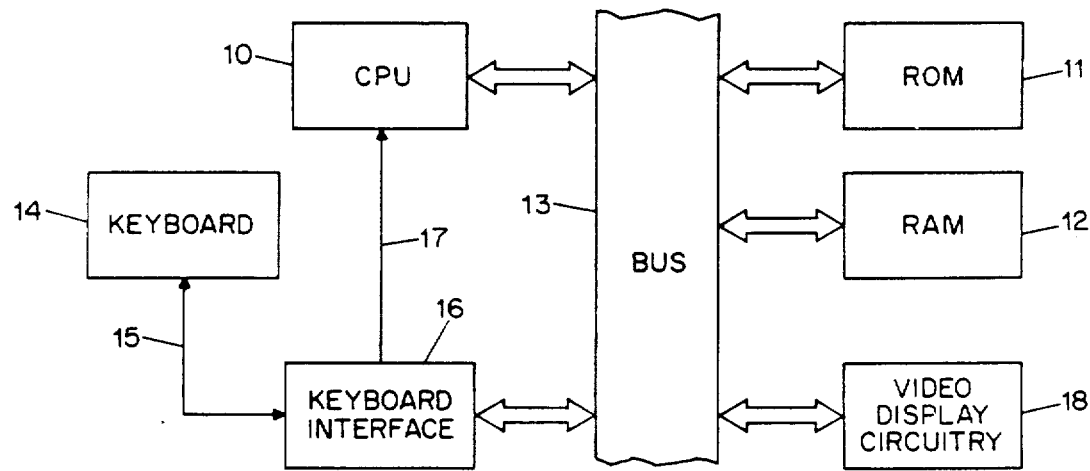
FIG. 1 is a block diagram illustrative of a portion of the hardware architecture of a typical personal computer, including a keyboard interface.

FIG. 1 shows a portion of the hardware architecture of a typical personal computer conforming to the industry standard that originated with the PC and AT models formerly manufactured by IBM. CPU 10 executes instructions and refers to data stored in ROM 11 and RAM 12, all by means of bus 13. Keyboard 14 contains circuitry for scanning an array of key switches, and generating scancodes corresponding to the pressing or releasing of respective keys. The scancodes are provided in the form of serial digital signals on keyboard cable 15 and are received by keyboard interface 16. The receipt of a scancode signal by the keyboard interface 16 is communicated to the CPU by means of hardware interrupt line 17, also called the scancode interrupt. Where no hot key TSRs have been installed, the receipt of the interrupt on line 17 causes the CPU to execute the INT 9 routine of BIOS, stored in ROM 11. If the scancode corresponds to a key value, the INT 9 routine derives the key value from the scancode and stores it in a keyboard buffer at a predetermined location in RAM 12. An applications program requiring a key value will call the INT 16 routine of BIOS which obtains a key value from the keyboard buffer in RAM 12 and places it in a predetermined CPU register. Control is then returned to the applications program, which obtains the key value from the CPU register.

The role of the BIOS in a personal computer and its interaction with applications programs are described, for example, in "The New Peter Norton Programmer's Guide to The IBM PC & PS/2", by Peter Norton and Richard Wilton, Microsoft Press, second edition 1988, and "Inside the IBM PC, Revised and Enlarged", by Peter Norton, Simon & Schuster, 1986.

The BIOS in the ROM is normally fixed at the time the computer is manufactured. However, the design of the BIOS ROM normally provides a number of known ways in which the user or a user program may nonetheless bypass or augment the ROM-based BIOS functions.

Figure 2:
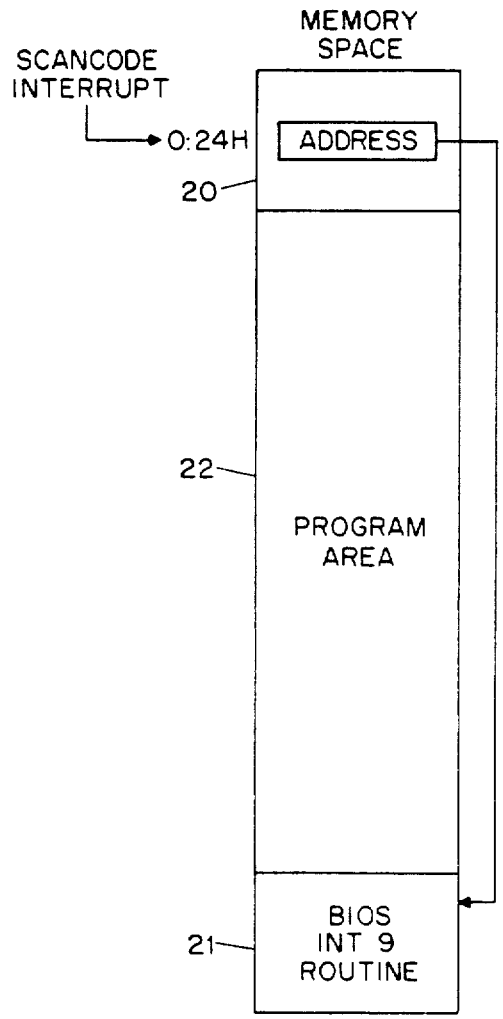
FIG. 2 is a memory map showing the memory space of the CPU in the personal computer of FIG. 1.

The BIOS routine handling the arrival of a scancode from the keyboard (the interrupt 9H routine) is located in ROM. But the typical arrangement in a personal computer does not have the CPU immediately commencing execution of the INT 9 routine upon the arrival of the scancode. Instead, the typical arrangement is for the CPU to inspect a location in what is called the interrupt vector area 20, shown in the memory map of FIG. 2. The interrupt vector area 20 is in RAM 12. The contents of a four-byte region in the interpretation area 20 starting at 0:24H are used to determine the address that will next be executed by the CPU. Upon power-up of the computer and before any hot-key TSRs are installed, the contents of that region direct the CPU to the INT 9 routine in the BIOS ROM region 21. Also shown in FIG. 2 is the applications program, which occupies some or all of the program area 22 located in RAM 12.

Figure 3:
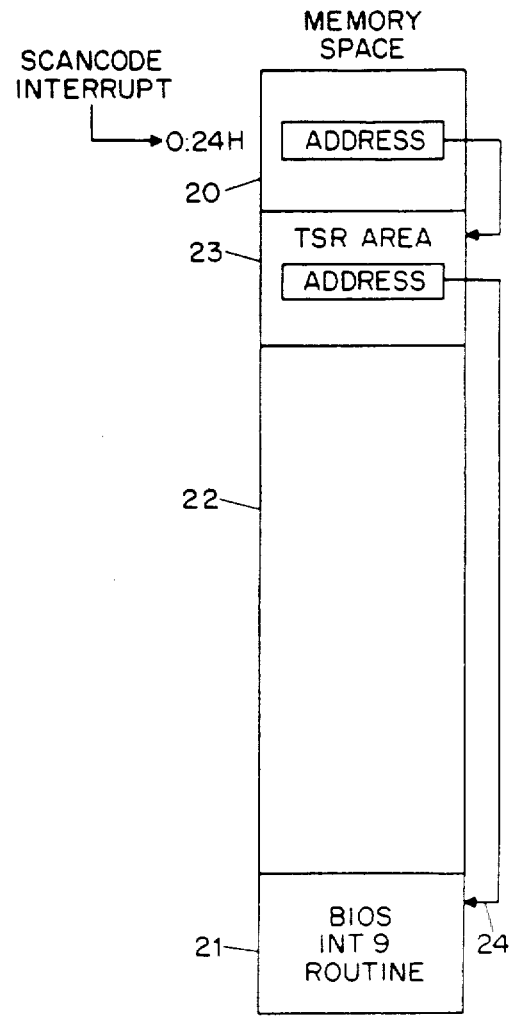
FIG. 3 is a memory map showing the memory space of the CPU in the personal computer of FIG. 1, after installation of a hot-key TSR.

FIG. 3 shows some of the changes that occur in the memory map when a hot-key TSR is installed in the personal computer. Part of the program area 22 is partitioned to serve as a TSR area 23. The contents of the region at 0:24H in the interrupt vector area 20, namely the region having to do with the scancode interrupt, are modified to contain a value that points to a predetermined location in the TSR area 23. The previous content of that region is copied into another predetermined location in the TSR area 23. When a scancode arrives, the scancode interrupt prompts the CPU to begin execution at the address stored at 0:24H. That address points to the TSR and results in the inspection of the received scancode to determine if the hot key associated with the TSR has been pressed. In the event that the scancode does not correspond to its hot key, the TSR causes the CPU to proceed with execution at the copied address as mentioned above. As indicated by the arrow 24 of FIG. 3, execution proceeds to the BIOS INT 9 routine.

Figure 4:
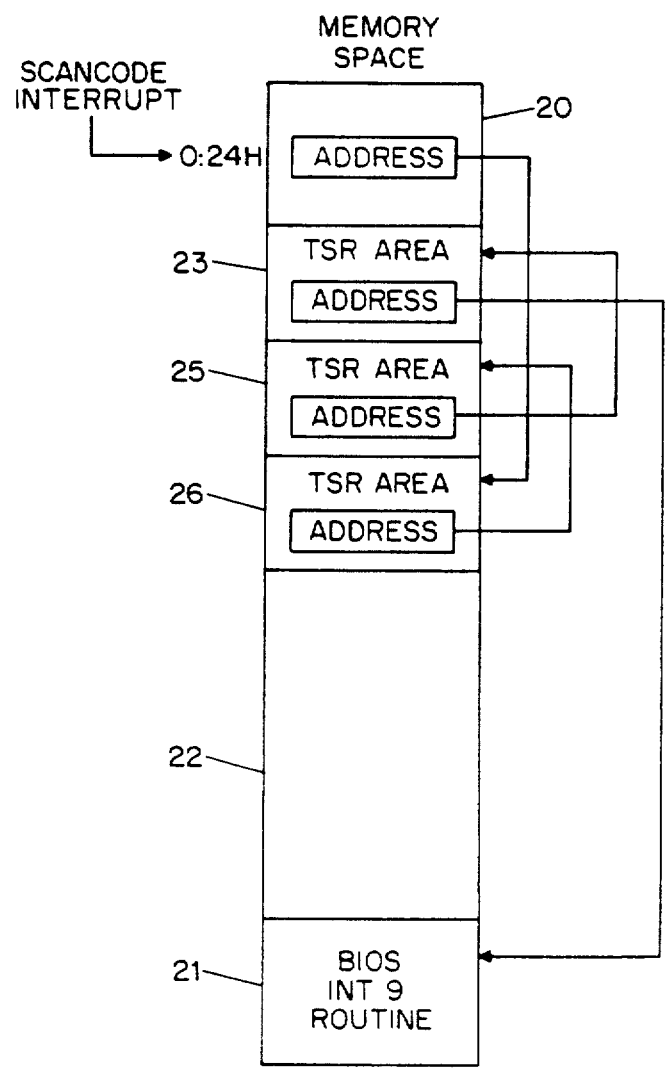
FIG. 4 is a memory map showing the memory space of the CPU in the personal computer of FIG. 1, after installation of three hot-key TSRs.

As mentioned above, a plurality of hot-key TSRs may be loaded in a conventional personal computer. Each such TSR, when loaded, simply copies the address found at 0:24H into a predetermined location within its own program area, and substitutes a preselected address associated with that TSR into 0:2H. FIG. 4 shows the memory map of the CPU after three hot-key TSRs have been loaded. The first TSR, loaded to area 23, contains the address pointing to the BIOS INT 9 routine. When the first TSR was loaded, it placed an address pointing to itself at 0.24H. When the second TSR was loaded, it copied the address pointing to the first TSR into its own area 25 and placed an address pointing to itself at 0:24H. When the third TSR was loaded, it copied the address pointing to the second TSR into its own area 26 and placed an address pointing to itself at 0:2H.

In typical applications, very few scancodes emitted by the keyboard correspond to the pressing of hot keys, and most of the scancodes correspond to ordinary key value inputs to the applications program being executed. A hot key TSR program being called to inspect a scancode corresponding to such a key value merely passes control to the address it copied from 0:24H. Where a plurality of hot key TSRs have been installed, as shown in FIG. 4, control passes from one TSR to the next and finally to the INT 9 routine each time a scancode corresponding to a such key value arrives.

When a scancode corresponding to a hot key for a particular TSR is received, that TSR takes control of the computer. In the case of most hot key TSRs, the TSR "pops up" on the screen by sending appropriate commands to the video display circuitry 18, shown in FIG. 1. At some later time the user presses keys to exit the TSR, whereupon control returns to the applications program that had been running before the hot key was pressed. Typically, the previous screen contents are restored as well.

Figure 5:
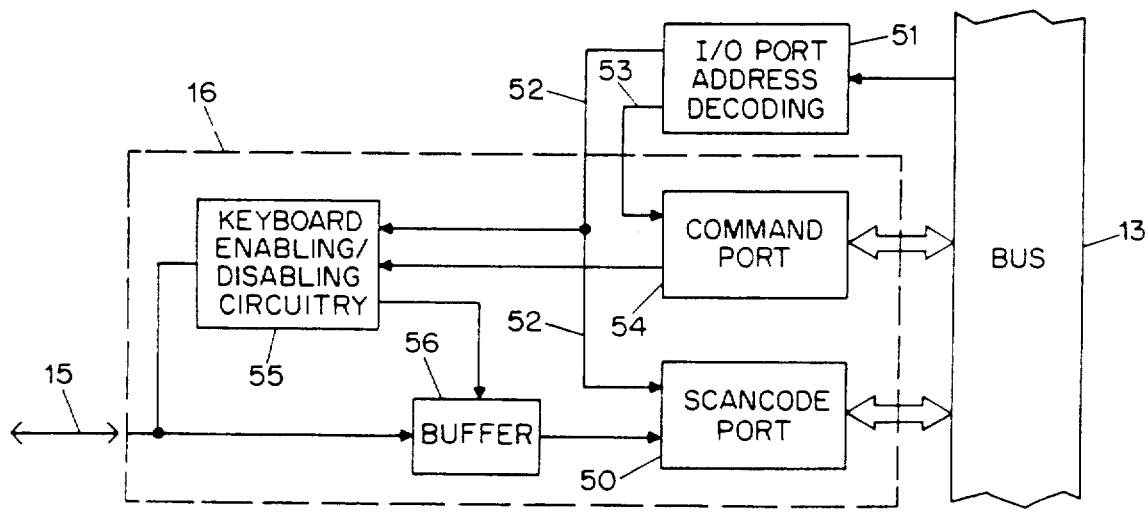
FIG. 5 is a functional block diagram of the keyboard interface of FIG. 1.

FIG. 5 shows the internal function of the keyboard interface 16 of FIG. 1 in greater detail. A scancode signal received on keyboard cable 15 is loaded into scancode port 50. The CPU determines the contents of scancode port 50 by 13, reading I/O port 60H via the bus 13. CPU selection of I/O port 60H is detected by I/O port address decoding circuitry 51, which provides signal 52 indicative of a keyboard interface data read operation. Port decoding circuitry 51 also provides a signal 53 selecting I/O port 64H to be used for reading and writing information from command port 54.

In keyboard interfaces used in many commercially available personal computers, such as the AT personal computer formerly manufactured by IBM and in computers designed to be compatible with the AT, the hardware of the keyboard interface 16 is implemented primarily with a 8042 microprocessor. The 8042 microprocessor has on-chip ROM and RAM, a serial input for receiving the serial scancode signals from the keyboard cable 15, and a parallel port for bidirectional data interchange with the bus 13. The manufacturer of a personal computer provides a program in the on-chip ROM so that the 8042 performs all the keyboard interface functions, including those represented in block 16 of FIGS. 1 and 5. For example, while command port 54 and scancode port 50 of FIG. 5 are portrayed in that figure as separate blocks, in most personal computers the physical hardware of a particular portion of the 8042 actually provides both ports.

In known keyboard interfaces employing the 8042 microprocessor, the program in the on-chip ROM is such that when the address decoder 51 provides the signal 52 indicative of a CPU read from I/O port 60H, the circuitry 55 for enabling and disabling the keyboard through the keyboard cable 15 reenables the keyboard. The CPU receives the present scancode from scancode port 50, and in as little as about one millisecond may replace the present scancode with a subsequently received scancode in the scancode port 50.

The subsequent scancode may be received by the keyboard interface directly from the keyboard cable 15. Alternatively, in some known keyboard interfaces a buffering capability provided by a buffer 56 may have stored one or more scancodes, and the presence of the signal 52 will initiate a process by the 8042 of loading one of the buffered scancodes into the scancode port 50.

As mentioned above, the functionalities depicted within block 16 are provided largely or entirely by the 8042 hardware in accordance with the program stored in its ROM. Thus, the keyboard enabling/disabling circuitry 55 and the optional buffer 56 are not necessarily physically separate, but are instead simply provided by the 8042. As will be discussed further below, the improved keyboard interface according to the invention may be provided by appropriate changes to the program in the ROM of the 8042.

In the keyboard interface according to the invention, when a scancode is received from the keyboard, it is placed in the scancode buffer. The scancode in the scancode buffer is not, however, permitted to change until either a timer expires or an enable keyboard command is received from the CPU.

The interval measured by the timer, called a timeout interval, is selected so that it is long enough for the inspection of current scancode by the longest permissible string of hot key TSRs, yet is as short as possible so as to minimize the extent to which it slows down the interface. Preferably, the constants that determine the length of the interval are stored in the RAM of the 8042 so that their values can be subsequently adjusted without the necessity of modification to the instructions in the ROM of the 8042.

In some commercially available personal computers, the 8042 is programmed to respond to a command from the CPU for modification of the contents of its RAM. In keyboard interfaces according to the invention, such a command, which is received at the command port 54 provides a means by which the CPU may modify the above-mentioned time-out interval.

As was mentioned above, in some known keyboard interfaces such as that described in U.S. Pat. No. 4,460,957 to Eggebrecht, the interface maintains the scancode in the scancode port continuously until such time as an enable signal was received from the CPU. The keyboard interface according to the invention allows loading of new scancode information in the scancode buffer if the keyboard interface receives an enable signal or the time-out interval expires. The reason for providing the time-out interval will now be explained.

Hot key TSRs designed to operate on AT-compatible personal computers, as described above, intercept and inspect scancodes by invoking the INT 9 routine of the BIOS. In the case where a scancode happens to correspond to a hot key, the TSR associated with that hot key will not pass control on to BIOS (or to other earlier-loaded TSRs) but will instead retain control. The TSR for the AT-compatible computer will not send an enable keyboard command to the keyboard interface 16, since the keyboard interface of such a personal computer would reenable the keyboard after the first reading the scancode port 50 caused, for example, by the last-loaded of the TSRs. In computers where the keyboard is not reenabled upon reading of the scancode port 50, it is necessary to ensure that the keyboard interface 16 does not maintain the contents of the scancode port 50 indefinitely, since that would tie up the keyboard interface 16. Thus, according to the invention, a time-out is provided in the program of the ROM of the 8042.

Figure 6:
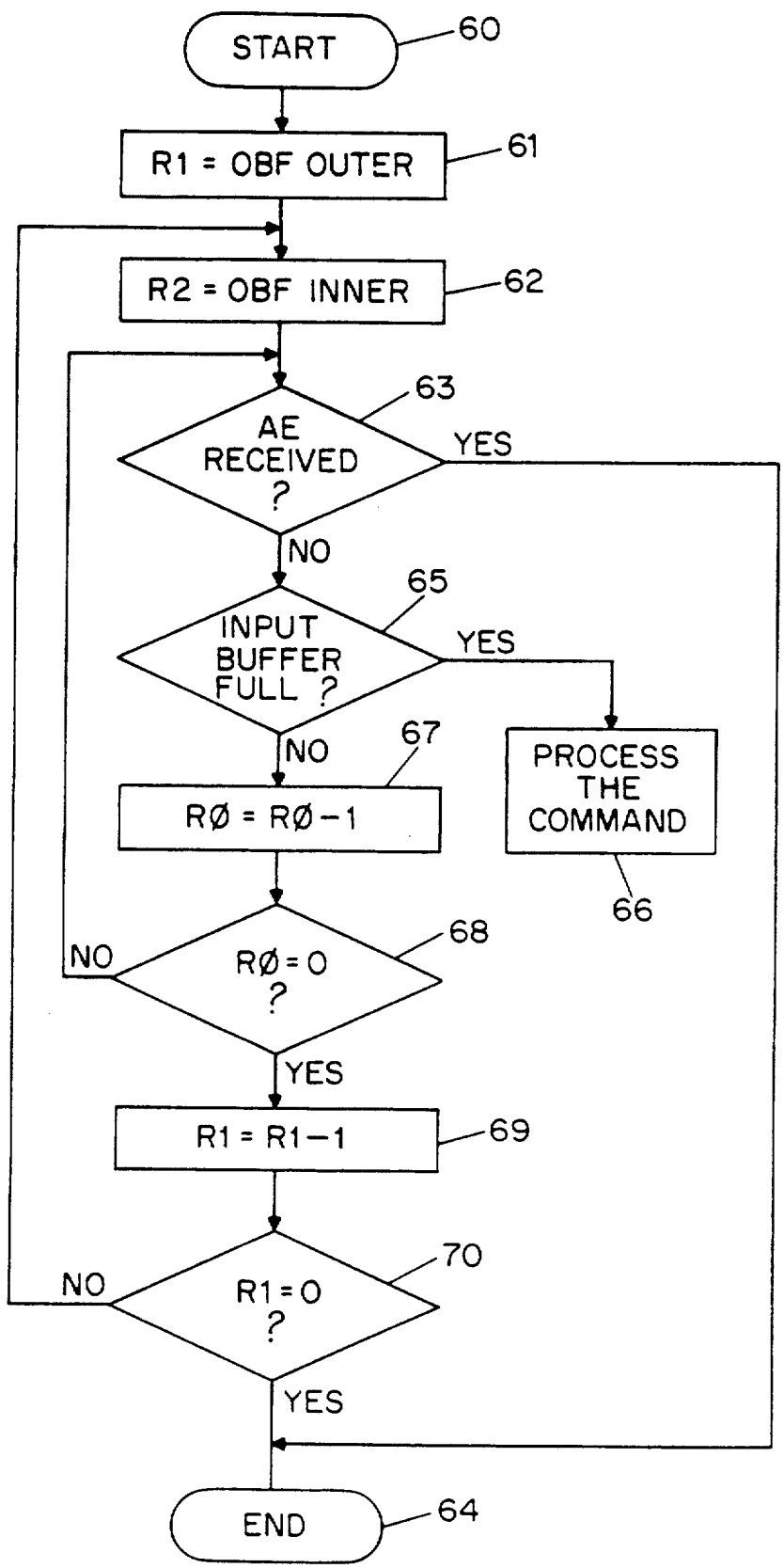
FIG. 6 is a flowchart of a portion of the program of the 8042 processor of the keyboard interface of FIG. 5 in accordance with the invention.

FIG. 6 shows a flowchart of a portion of the program of the on-board ROM of the 8042 according to the invention. When the 8042 is executing its program, it will from time to time place a received scancode in the scancode port 50. That occurs in the conventional manner preceding the start block 60 of FIG. 6 and is not shown in that figure. In known keyboard interfaces, the next time the CPU carries out a read of the scancode port the keyboard will be reenabled and a new scancode may be loaded into the scancode port 50 in as little as one millisecond. Such reenabling in the conventional manner is also not depicted in the figure.

Following the flow shown in FIG. 6, the 8042 will, after placing a scancode into the scancode port 50, load a constant OBFOUTER into register r1. OBFOUTER is a constant which, as mentioned above, is preferably stored in the RAM of the 8042. This occurs in block 61. In block 62 a constant OBFINNER is loaded into register r0. OBFINNER is likewise preferably stored in the RAM of the 8042. The power-up routine of the 8042 includes steps to set initially the values of OBFOUTER and OBFINNER in the RAM. Registers r0 and r1 are registers within the 8042. Depending on the actions of the assembler used to assemble the code to be loaded into the ROM, registers r0 and r1 may be discrete processor registers of the 8042 processor or may be locations within the RAM of the 8042. Preferably they are processor registers.

In block 63 a test is made to determine whether an AE (keyboard enable) signal has been received from the CPU. If the result is yes, control proceeds to end block 64, and another scancode may be loaded into scancode port 50.

If the result of the test of block 63 is no, then control passes to block 65, where a test is made to see whether any command has been received from the CPU by way of command port 54. If the result is yes, then control passes to block 66, and the command is processed in the conventional manner. (The command is processed as in the prior art, and eventually execution again reaches the start block 60, and the timer values are reinitialized in blocks 61 and 62). If the result of the test of block 65 is no, then the value of r0 is decremented in block 67.

Next, a test is made at block 68 to determine whether the value in register r0 is zero. If the result is no, then control proceeds to block 63. If the result is yes, then control passes to block 69, where the value of r1 is decremented. At block 70, a test is made to determine whether the value in register r1 is zero. If the result of the test is no, then control proceeds to block 62. If the result is yes, then the end block 64 is reached.

Blocks 62 through 68 form an inner loop. The value of OBFINNER is preferably initially set to a value selected so that about one millisecond is required to decrement r0 down to zero. With a 12 MHz clock driving the 8042, it is found that a value of 80 decimal for OBFINNER gives the desired result.

Blocks 61 through 70 form an outer loop. The value of OBFOUTER may be selected so as to determine the number of milliseconds of the time-out interval. In the present embodiment, the desired time-out interval is greater than two milliseconds, and advantageously is ten milliseconds, so the value of OBFOUTER is initially set to 10 decimal.

The use of the two loops as shown in FIG. 6, as opposed to a single loop, will now be explained. The registers, arithmetic unit, and internal data path of the 8042 are all eight bits wide. Consequently, in loops such as portrayed in FIG. 6, there is an effective upper bound of 256 decimal as the largest number of cycles which can be performed in the delay loop, by setting the value at an initial value of zero. However, at commonly used clock speeds, the longest possible resulting delay loop would be a few milliseconds. For example, at 12 MHz the longest possible delay loop is about three milliseconds. Since time-out intervals of a few tens of seconds are desired, two loops are used. The inner loop, as described above, is designed to take about one millisecond, and the outer loop determines the total number of milliseconds in the overall delay.

Figure 7:
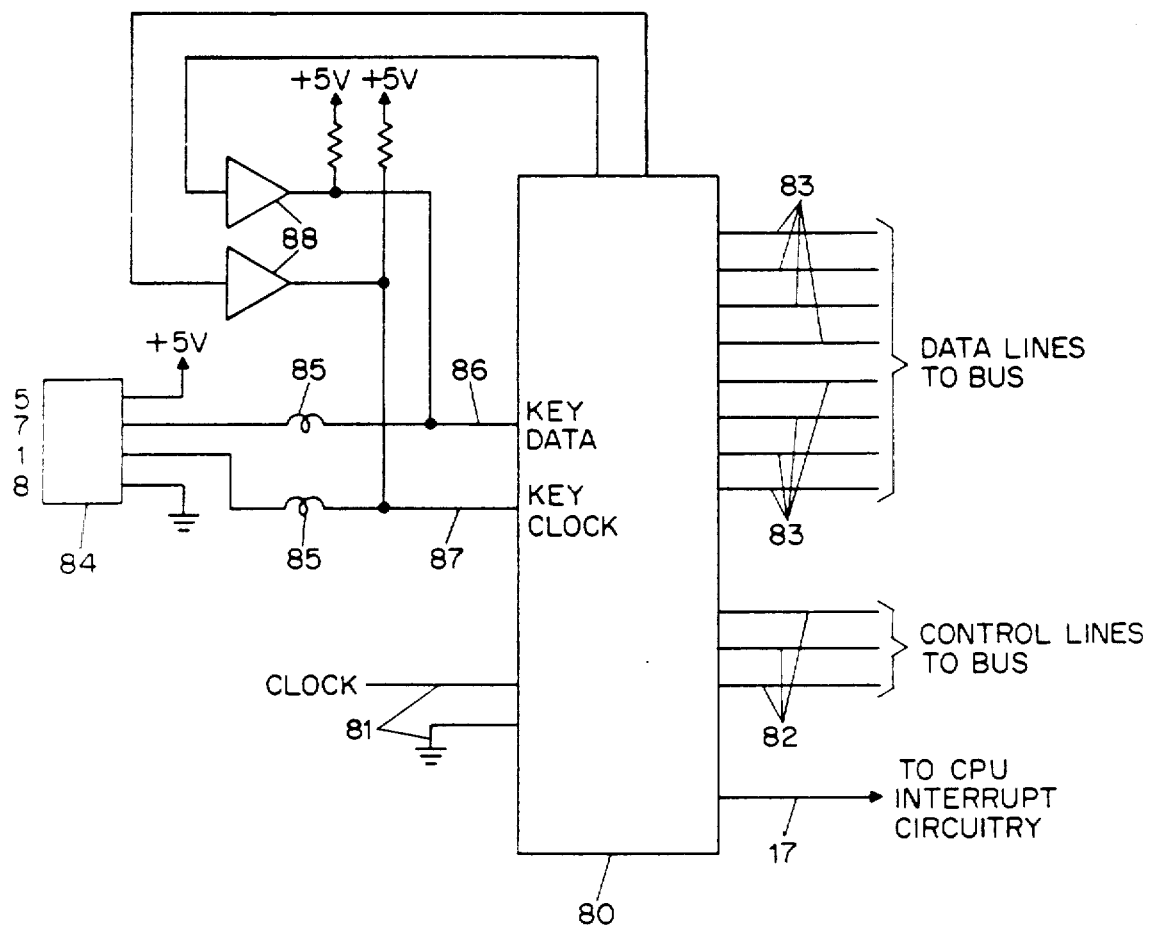
FIG. 7 is a schematic diagram of the circuitry of the keyboard interface of FIG. 1.

Referring to FIG. 7, the keyboard interface 16 is shown in the form of a schematic diagram. The 8042 processor 80 has power and ground connections, not shown, and receives a clock signal at 12 MHz from clock generation circuitry, not shown, by way of clock input lines 81. Control lines 82 from I/O address decoding circuitry, not shown, communicate to the processor 80 whether I/O port 60H (for scancodes and other data) or 64H (for commands) has been selected by the CPU on the bus. Control lines 82 also communicate to the 8042 processor 80 whether the I/O port transaction specified by the CPU is a read or write. In response to the lines 82, the processor 80 gates data onto or receives data from the bus, as appropriate. The data pass over the eight data lines 83.

Connector 84 has four relevant pins. Pin 5 carries +5V to power the keyboard, while pin 8 provides a power return for the keyboard. Pin 7 receives serial synchronous scancode data from the keyboard, and pin 1 receives a clock signal from the keyboard which clocks the synchronous scancode data from the keyboard. Pin 8 also provides the ground reference for the clock and data lines. Chokes 85 limit the propagation of spurious RF emissions along the keyboard cable.

A start bit on data line 86 as detected by 8042 processor 80 indicates that a scancode is being sent by the keyboard, and by reference to keyboard clock signals on clock line 87, the bits of the scancode are received and assembled into words to be presented in parallel over data lines 83. Drivers 88 are also provided, whereby the keyboard interface may send information to the keyboard over the clock and data lines of the keyboard cable, which are bidirectional. It is by means of the drivers 88 that the keyboard interface may disable the keyboard to keep it from transmitting further scancodes.

Discrete output line 17 from 8042 processor 80 provides the scancode interrupt to the CPU interrupt circuitry.

While the present invention is described in terms of the foregoing specific embodiment, it will be apparent to persons skilled in the art that various modifications and alterations may be made to the disclosed embodiment without departing from the spirit or the scope of the invention as defined by the appended claims.

We claim:

1. For use in a keyboard interface for interfacing a keyboard providing scancodes corresponding to actuation of respective keys thereof to a data bus of a central processor, the central processor providing a keyboard enable signal upon completion of processing of a key value associated with a scancode received at the data bus, and the keyboard interface for measuring a predetermined interval of time, a method comprising the steps of:

storing a scancode provided by the keyboard and received by the keyboard interface, thereby prompting the keyboard interface to commence measurement of the predetermined interval of time;

providing an interrupt to the central processor indicative of the receipt of the scancode by the keyboard interface, thereby prompting the central processor to process the scancode;

maintaining the scancode available to the data bus of the central processor until the passage of the predetermined interval of time measured by the keyboard interface, if no keyboard enable signal is received by the keyboard interface from the central processor during the predetermined interval of time; and after completion of the previous maintaining step, maintaining any subsequently received scancode available to the data bus.

2. The method of claim 1 wherein the predetermined interval is at least two milliseconds.

3. The method of claim 1 further comprising a step of receiving from the central processor a command indicative of a corresponding time interval and storing within the keyboard interface information indicative of the corresponding time interval, whereby the predetermined interval of time is determined by the stored information indicative of the corresponding time interval.

4. For use in a computer having a central processor including a data bus and means for providing a keyboard enable signal, said computer for receiving scancodes corresponding to actuation of respective keys of a keyboard means, a keyboard interface means for receiving the scancodes from the keyboard means via a keyboard connection means and for providing the received scancodes to the central processor by transactions on the data bus, wherein the keyboard interface means comprises:

input means for storing a scancode received from the keyboard means, for providing an interrupt to the central processor via a hardware interrupt line in response to the receipt of the scancode thereby prompting the central processor to process the scancode, and for receiving the keyboard enable signal from the central processor; timing means, responsive to the input means receiving the scancode and to the input means receiving the keyboard enable signal, for providing a delay signal after a predetermined interval from the time the scancode is received by the input means if the keyboard enable signal has not been provided by the central processor to the input means;

output means responsive to the input means receiving the scancode for making the scancode available to the data bus of the central processor and responsive to the central processor and the timing means for keeping the scancode available to the data bus until the first of the following two events occurs:
  (i) the central processor provides the keyboard enable signal to the output means, and
  (ii) the timing means provides the delay signal to the output means.

5. The keyboard interface means of claim 4 further comprising a microprocessor for executing a program stored in a memory means of the microprocessor, wherein said microprocessor comprises the input means, the timing means, and the output means.

6. The keyboard interface means of claim 5, wherein a value representative of the predetermined interval is stored in the memory means of the microprocessor, the stored value being set by a command from the central processor.

7. The keyboard interface means of claim 4, wherein the keyboard connection means comprises a serial synchronous communications line.

8. The keyboard interface means of claim 14, wherein the predetermined interval is no less than 2 milliseconds.

9. The keyboard interface means of claim 4, wherein the keyboard connection means is a cable.

* * * * *

UNITED STATES PATENT AND TRADEMARK OFFICE
CERTIFICATE OF CORRECTION

PATENT NO. : 5,056,057
DATED : October 8, 1991
INVENTOR(S) : Johnson et al.

It is certified that error appears in the above-identified patent and that said Letters Patent is hereby corrected as shown below:

```
Column 6, line 6, "0:2H" should read --0:24H--; Column
6, line 11, "0.24H" should read --0:24H--; Column 6,
line 17, "0:2H" should read --0:24H--;
                                          Column 11, line 6,
"means." should read --means, whereby the output means
maintains any subsequently received scancode available
to the data bus only thereafter.--; Column 12, line 8,
"claim 14" should read --claim 4--.
```

Signed and Sealed this

Ninth Day of March, 1993

Attest:

STEPHEN G. KUNIN

Attesting Officer

Acting Commissioner of Patents and Trademarks